(12) United States Patent
Shekhter et al.

(10) Patent No.: US 6,171,363 B1
(45) Date of Patent: Jan. 9, 2001

(54) METHOD FOR PRODUCING TANTALLUM/ NIOBIUM METAL POWDERS BY THE REDUCTION OF THEIR OXIDES WITH GASEOUS MAGNESIUM

(75) Inventors: Leonid N. Shekhter, Newton; Terrance B. Tripp, Westboro; Leonid L. Lanin, Belmont, all of MA (US)

(73) Assignee: H. C. Starck, Inc., Newton, MA (US)

( * ) Notice: Under 35 U.S.C. 154(b), the term of this patent shall be extended for 0 days.

(21) Appl. No.: 09/073,488

(22) Filed: May 6, 1998

(51) Int. Cl.$^7$ .......................................................... B22F 9/22
(52) U.S. Cl. .................................................................. 75/369
(58) Field of Search ............................ 75/613, 622, 623, 75/363, 369

(56) References Cited

U.S. PATENT DOCUMENTS 1,602,542 * 10/1926 Marden .
2,881,067 * 4/1959 Hivert et al. .
3,647,420 * 3/1972 Restelli .
3,658,507 * 4/1972 Gohin et al. .
4,483,819 * 11/1994 Albrecht et al. ........................ 419/2

* cited by examiner

Primary Examiner—Ngoclan Mai
(74) Attorney, Agent, or Firm—Perkins, Smith & Cohen, LLP; Jerry Cohen

(57) ABSTRACT

Metal powder from the group Ta, Nb, Ti, Mo, W, V, Zr, Hf preferrably Ta or Nb, is made in a fine powder form by reduction of metal oxide by contact with a gaseous reducing agent, preferrably an alkaline earth metal, to near complete reduction, leaching, further deoxidation and agglomeration, the powder so produced being sinterable to capacitor anode form and processable to other usages.

11 Claims, 10 Drawing Sheets

METHOD FOR PRODUCING TANTALUM/NIOBIUM METAL POWDERS BY THE REDUCTION OF THEIR OXIDES WITH GASEOUS MAGNESIUM

FIELD AND BACKGROUND OF THE INVENTION

This invention relates to the production of tantalum, niobium, and other metal powders by the reduction of the corresponding metal oxide with gaseous active metals such as Mg, Ca, and other elemental and compound reducing materials, in gaseous form.

Tantalum and niobium are members of a group of metals that are difficult to isolate in the free state because of the stability of their compounds, especially the oxide. A review of the methods developed to produce tantalum will serve to illustrate the history of a typical manufacturing process for these metals. Tantalum metal powder was first produced on a commercial scale in Germany at the beginning of the 20th Century by the reduction of the double salt, potassium heptafluorotantalate ($K_2TaF_7$) with sodium. Small pieces of sodium were mixed with the tantalum containing salt and sealed into a steel tube. The tube was heated at the top with a ring burner and, after ignition, the reduction reaction proceeded quickly down the tube. The reaction mixture was allowed to cool and the solid mass, consisting of tantalum metal powder, unreacted $K_2TaF_7$ and sodium, and other products of the reduction was removed by hand using a chisel. The mixture was crushed and then leached with dilute acid to separate the tantalum from the other components. The process was difficult to control, dangerous, and produced a coarse, contaminated powder, but nevertheless pointed the way to what became the principal means of production of high purity tantalum in later years.

Commercial production of tantalum metal in the United States began in the 1930's. A molten mixture of $K_2TaF_7$ containing tantalum oxide ($Ta_2O_5$) was electrolyzed at 700° C. in a steel retort. When the reduction reaction was completed, the system was cooled and the solid mass removed from the electrolysis cell, and then crushed and leached to separate the coarse tantalum powder from the other reaction products. The dendritic powder was not suitable for use directly in capacitor applications.

The modern method for manufacturing tantalum was developed in the late 1950's by Hellier and Martin.[1] Following Hellier and Martin, and hundreds of subsequently described implementations or variations, a molten mixture of $K_2TaF_7$ and a diluent salt, typically NaCl, is reduced with molten sodium in a stirred reactor. Using this system, control of the important reaction variables, such as reduction temperature, reaction rate, and reaction composition, was feasible. Over the years, the process was refined and perfected to the point where high quality powders with surface area exceeding 20,000 $cm^2/gm$ are produced and materials with surface area in the 5000–8000 $cm^2/gm$ range being typical. The manufacturing process still requires the removal of the solid reaction products from the retort, separation of the tantalum powder from the salts by leaching, and treatments like agglomeration to improve the physical properties. Most capacitor grade tantalum powders are also deoxidized with magnesium to minimize the oxygen content.[2] Artifacts of preagglomeration of primary particles to secondary particle form and doping with materials to enhance capacitance (e.g. P, N, Si, C) are also known today.

[1] Hellier, E. G. and Martin, G. L., U.S. Pat. No. 2,950,185, 1960.
[2] Albrecht, W. W., Hoppe, H., Papp, V. and Wolf, R., U.S. Pat. No. 4,537,641, 1985.

While the reduction of $K_2TaF_7$ with sodium has allowed the industry to make high performance, high quality tantalum powders, there are several drawbacks to this method. It is a batch process prone to the inherent variability in the system; as a result, batch to batch consistency is difficult. Post reduction processing (mechanical and hydrometallurgical separations, filtering) is complex, requiring considerable human and capital resources and it is time consuming. The disposal of large quantities of reaction products containing fluorides and chlorides can be a problem. Of fundamental significance, the process has evolved to a state of maturity such that significant advances in the performance of the tantalum powder produced is unlikely.

Over the years, numerous attempts were made to develop alternate ways for reducing tantalum and similar metal compounds to the metallic state.[3] Among these were the use of active metals other than sodium, like calcium, magnesium, and aluminum and raw materials such as tantalum pentoxide and tantalum chloride. As seen in Table I, the negative Gibbs free energy changes mean that the reduction of the oxides of Ta, Nb, and other metals with magnesium to the metallic state is favorable; reaction rate and method determine the feasibility of using this approach to produce high quality powders on a commercial scale. To date, none of these approaches were commercialized significantly because they did not produce high quality powders. Apparently, the reason this approach failed in the past was because the reductions were carried out by blending the reducing agent with the metal oxide. The reaction took place in contact with the molten reducing agent and this condition adversely affected the morphology and even the chemistry of the products.

[3] Miller, G. L,. "Tantalum and Niobium", London, 1959, pp. 189–94; Marden, J. W. and Rich, M. H., U.S. Pat. No. 1,728,941, 1927; and Gardner, D., U.S. Pat. No. 2,516,863, 1946.

TABLE I

Gibbs Free Energy Change for Reduction of Metal Oxides with Magnesium
$M_xO_y(s) + yMg(g) \rightarrow yMgO(s) + xM(s)$

| Temperature | Gibbs Free Energy Change (Kcal/mole oxide) | | | | | |
| --- | --- | --- | --- | --- | --- | --- |
| ° C. | $Ta_2O_5$ | $Nb_2O_5$ | $TiO_2$ | $V_2O_3$ | $ZrO_2$ | $WO_2$ |
| 200 | −219 | −254 | −58 | −133 | −22 | −143 |
| 400 | −215 | −249 | −56 | −130 | −21 | −141 |
| 600 | −210 | −244 | −55 | −126 | −20 | −139 |
| 800 | −202 | −237 | −52 | −122 | −18 | −137 |
| 1000 | −195 | −229 | −50 | −116 | −15 | −134 |
| 1200 | −186 | −221 | −47 | −111 | −13 | −131 |
| 1400 | −178 | −212 | −45 | −106 | −11 | −128 |

The use of magnesium to deoxidize or reduce the oxygen content of tantalum metal is well known.[4] The process involves blending the metal powder with 1–3 percent magnesium and heating to achieve the reduction process. The magnesium is in the molten state during a portion of the heating time. In this case, the objective is to remove 1000–3000 ppm oxygen and only a low concentration of MgO is produced. However, when a much greater quantity of tantalum oxide is reduced a large quantity of magnesium oxide is generated. The resulting mixture of magnesium, tantalum oxide and magnesium oxide can form tantalum-magnesium-oxygen complexes that are difficult to separate from the tantalum metal.

[4] See n. 2, above.

It is a principal object of the invention to provide a new approach to production of tantalum and similar metals that provides a means of eliminating one or more, preferrably all, the problems of traditional double salt reduction and follow on processing.

It is a further object of the invention to enable a continuous production process.

It is a further object of the invention to provide improved metal forms.

SUMMARY OF THE INVENTION

We have discovered that the prior art problems can be eliminated when metal oxides such as $Ta_2O_5$ and $Nb_2O_5$ in massive amounts are reduced with magnesium in gaseous form, substantially or preferably entirely. The oxide source should be substantially or preferably entirely in solid state although there is more tolerance for molten state as to the oxide compared to the reducing agent. The oxide is provided in the form of a porous solid with high access throughout its mass by the gaseous reducing agent.

The metals that can be effectively produced singly or in multiples (co-produced) through the present invention are in the group of Ta, Nb, Ti, Mo, V, W, Hf, Zr. The metals can also be mixed or alloyed during or after production and/or formed into useful compounds of such metals. The respective stable and unstable oxide forms of these metals can be used as sources.

The suitable reducing agents include the gaseous forms of the elements Mg, Ca, Al, Li, Ba, Sr and their alloys and compounds. Under some circumstances hydrogen, hydrides, methane, ammonia and related compounds can be used with oxides of some of the above named metals.

In selective appropriate combinations of metal, metal oxide source and reducing agent, account must be taken of melting and boiling points, partial pressures, enthalpy of formation, Gibbs free energy change, density, surface/volume ratio, surface area and silo morphology of product and freedom from impurities.

Vapor pressures of some of the reducing agents are given as follows:

| Temp (° C.) | Aluminum P (Atmospheres) |
|---|---|
| 2,000 | $5.3 \times 10^{-2}$ |
| 2,100 | $1.0 \times 10^{-1}$ |
| 2,200 | $1.9 \times 10^{-1}$ |
| 2,300 | $3.3 \times 10^{-1}$ |
| 2,400 | $5.6 \times 10^{-1}$ |
| 2,500 | $9.0 \times 10^{-1}$ |
| 2,600 | 1.4 |

| Temp (° C.) | Magnesium P (Atmospheres) |
|---|---|
| 800 | $4.7 \times 10^{-2}$ |
| 850 | $8.9 \times 10^{-2}$ |
| 900 | $1.6 \times 10^{-1}$ |
| 950 | $2.7 \times 10^{-1}$ |
| 1000 | $4.8 \times 10^{-1}$ |
| 1050 | $7.2 \times 10^{-1}$ |
| 1100 | 1.1 |

| Temp (° C.) | Calcium P (Atmospheres) |
|---|---|
| 1,000 | $1.7 \times 10^{-2}$ |
| 1,100 | $5.1 \times 10^{-2}$ |
| 1,200 | $1.3 \times 10^{-1}$ |
| 1,300 | $2.9 \times 10^{-1}$ |
| 1,400 | $6.0 \times 10^{-1}$ |
| 1,500 | 1.1 |

| Temp (° C.) | Lithium P (Atmospheres) |
|---|---|
| 1,000 | $5.1 \times 10^{-2}$ |
| 1,100 | $1.4 \times 10^{-1}$ |
| 1,200 | $3.8 \times 10^{-1}$ |
| 1,300 | $7.2 \times 10^{-1}$ |
| 1,400 | 1.4 |

The temperature of reduction varies significantly depending on the reducing agent used. The temperature ranges for reduction of metal (Ta, Nb) oxide are: with $Mg_{(gas)}$–800–1,100° C., $Al_{(gas)}$–1,100–1,500° C., $Li_{(gas)}$–1,000–1,400° C., $Ba_{(gas)}$–1,300–1,900° C. Different physical properties as well as morphology of the primary metal powder produced by reduction can be achieved by variations of temperature and other conditions of processing within the effective reduction range.

The invention includes a first massive reduction step reducing an oxide source of selected metal(s) substantially to free 80–100% (by wgt.) of the metal values therein as primary powder particles, then leaching or other steps of hydrometallurgy to separate the metal from residual reducing agent oxide and other byproducts (if any) of the reduction reaction and from residual condensed reducing agent (if any), followed by one or more deoxidation steps under less concentrated reagent conditions than in the first gross reduction step (and with better tolerance of molten state of the reducing agent), then further separation as might be needed.

The metal powders produced are suitable for use in electronic capacitors and other applications including, e.g., metallurgy (powder metallurgy and/or remelting and mill product and/or fabricated part manufacture), additives and alloying ingredients (e.g. ferrometallurgy, manufacture of complex electro-optical and ceramic compounds from oxide such as PMN structures), combustibles, catalysis, etc.

The Ta, Nb, Ti, Mo, V, W, Hf, Zr powders (singly or as mixtures or alloys) can have many specific uses including, but not limited to, the following:

as such (in primary particle form) in catalysis and in combusting applications (e.g. flashbulb igniters);

in the manufacture of porous capacitor anodes for use with wet or solid electrolytes, the powder being used in primary particle form or, in secondary form, i.e., as agglomerated[5] aggregates (agglomerates) of three to several thousand primary particles, typically 10 to 1000, while preserving a high particle surface area and surface to volume ratio;

as coherent masses formed by physical compacting and/or sintering including sintered compacts of primary or secondary particles, made with or without pre-compacting or simultaneous compacting, to form metallurgical products or electrical products, such as electrodes usable in electrolytic systems including batteries, fuel cells and electrolysis treatment apparatus.

[5] The agglomeration can be thermal and/or physical agglomeration accomplished by a variety of well known methods.

The invention comprises the said powders, the methods of producing such powders, certain derivative products made from such powders and methods for making such derivative products.

The capacitor usage can be accompanied by other known artifacts of capacitor production such as doping with agents to retard sinter densification or otherwise enhance end product capacitance, leakage and voltage breakdown.

The invention enables several distinct breakthroughs in several of its various fields of application.

First, the well known high performance tantalum powders for making computer/telecommunications grade solid electrolyte, small size capacitors (high capacitance per unit volume and stable performance characteristics) can now be made with substantial net savings of cost, complexity and time.

Second, other reactive metals—especially Nb and alloys, e.g. Ta—Nb, Ta—Ti, Nb—Ti, can be introduced as replacements for Ta in capacitors in certain applications with a cost saving or as replacements for the high end Al market with much better performance, particularly enabling much smaller sizes for equivalent capacitance and use of solid electrolyte. Commercial aluminum electrolytic capacitors use wet electrolyte systems.

Superconductive alloys such as Nb—Ti, Nb—Zr, Nb—Ti—Zr, can be produced by co-reduction or by making the metal components and alloying.

Other objects, features and advantages will be apparent from the following detailed description of preferred embodiments taken in conjunction with the accompanying drawings in which:

DETAILED DESCRIPTION OF PREFERRED EMBODIMENTS

EXAMPLE 1 (comparison)

A mixture of $Ta_2O_5$ and magnesium was loaded into a tantalum tray and covered with tantalum foil. The magnesium stoichiometry was 109% of that required to completely reduce the tantalum oxide. The mixture was heated at 1000° for six hours in an argon atmosphere. The mixture was not agitated during the reduction process. After cooling, the products were passivated by programmed addition of oxygen. The result of the reduction process was a black spongy material that was difficult to break up. The product was leached with dilute mineral acid to remove the magnesium oxide, dried and screened. The yield of the coarse (+40 mesh) material was high at 25 percent. The impurity content of each (as % or ppm) and surface areas (SA, $cm^2/gm$) of the +40 and −40 fractions are given in Table1.1, below. Both the magnesium and oxygen contents were high. The large percentage of coarse material and poor quality of the product made it unsuitable for use in capacitor applications.

TABLE 1.1

|  | O % | N ppm | C ppm | S ppm | Na ppm | K ppm | Mg ppm | SA $cm^2/gm$ |
|---|---|---|---|---|---|---|---|---|
| +40 mesh | 7.6 | 840 | 21 | <5 | <1 | <10 | >7000 | 17,000 |
| −40 mesh | 4.7 | 413 | 47 | <5 | <5 | <10 | >7000 | 35,000 |

EXAMPLE 2

Figure 1:
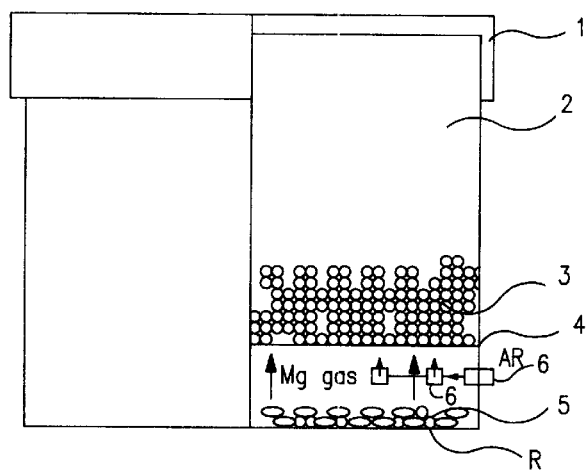
FIGS. 1–4 show sketch outlines of processing systems for practice of the present invention.
Figure 5A:
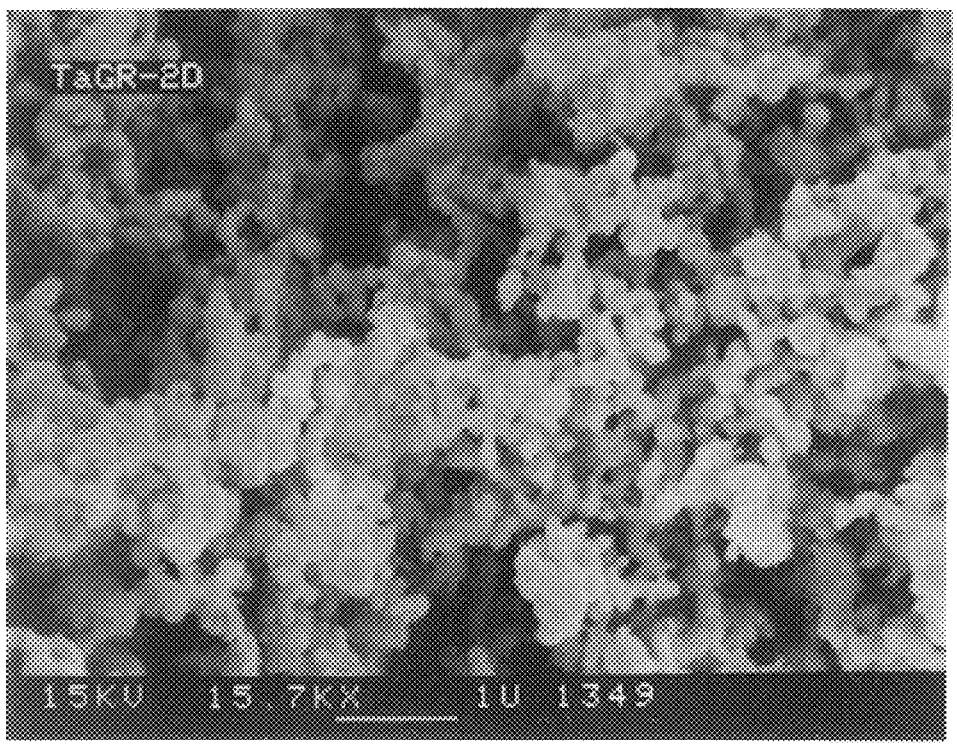
FIGS. 5A–8D are scanning electron micrographs (SEMs) of powders produced according to the present invention, including some SEMs of state of the art or comparison examples of metal powders made otherwise than in accordance with the present invention.
Figure 5B:
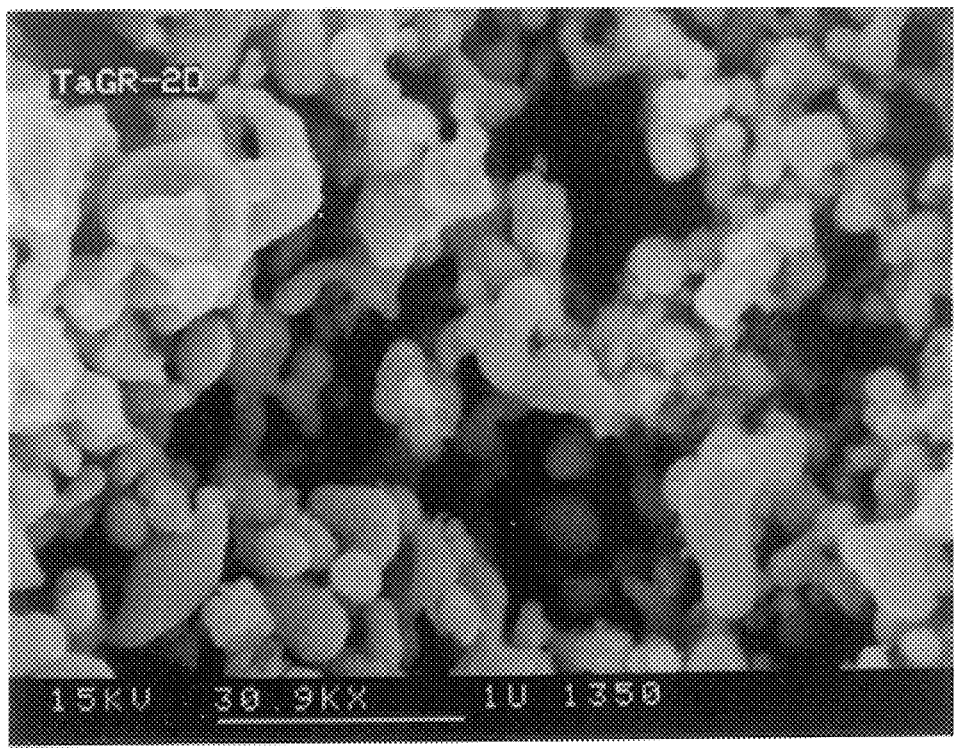
Figure 5C:
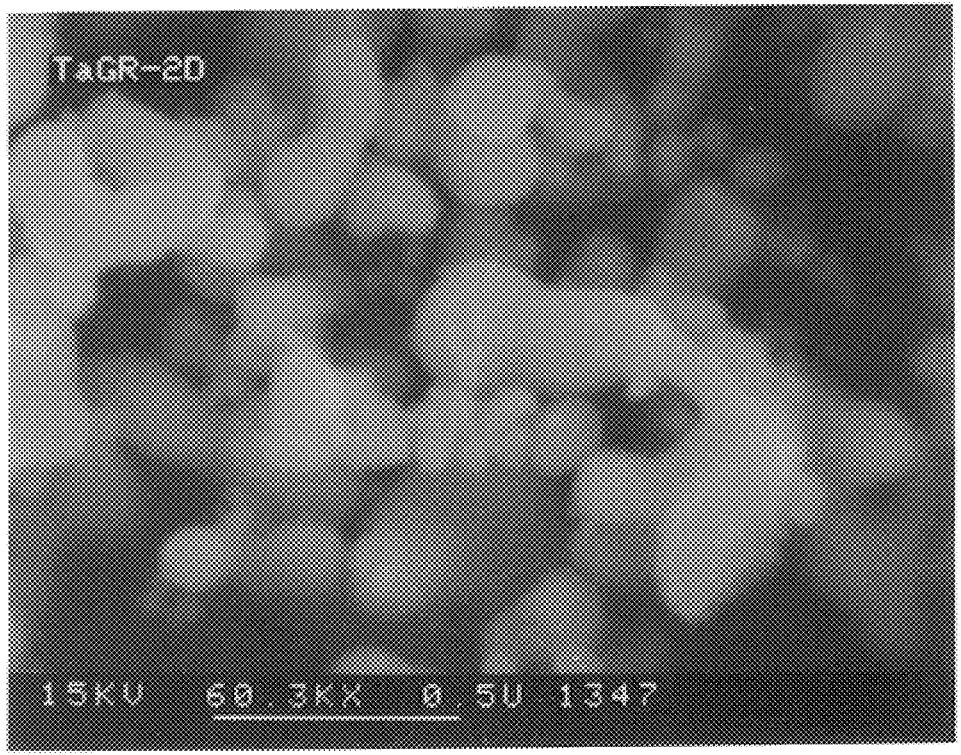
Figure 5D:
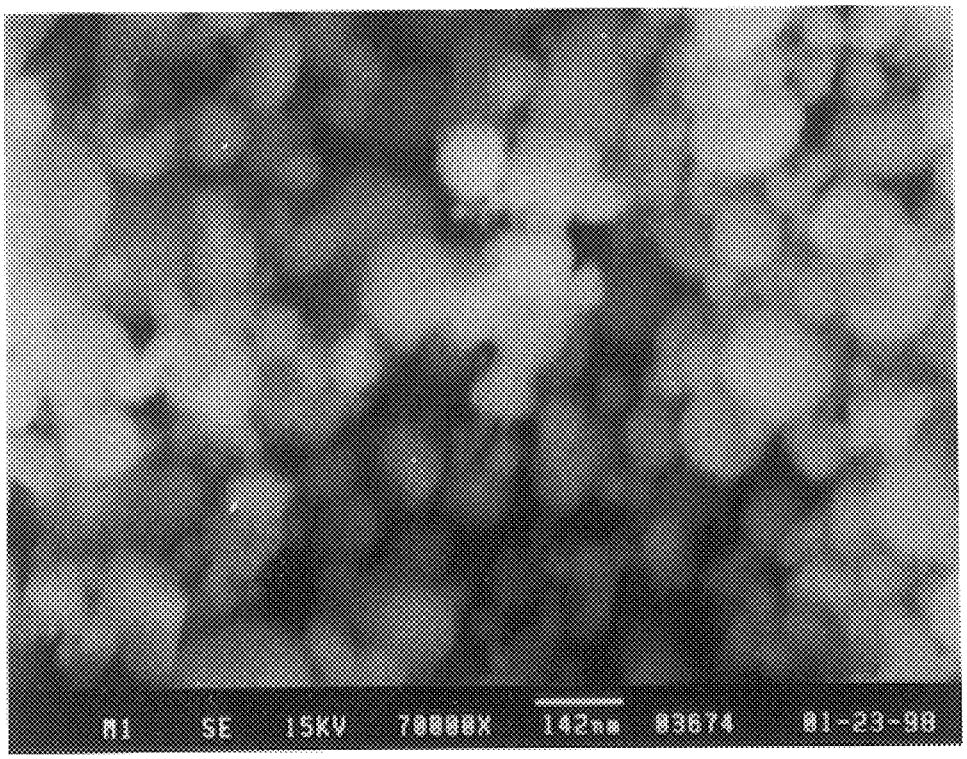
Figure 5E:
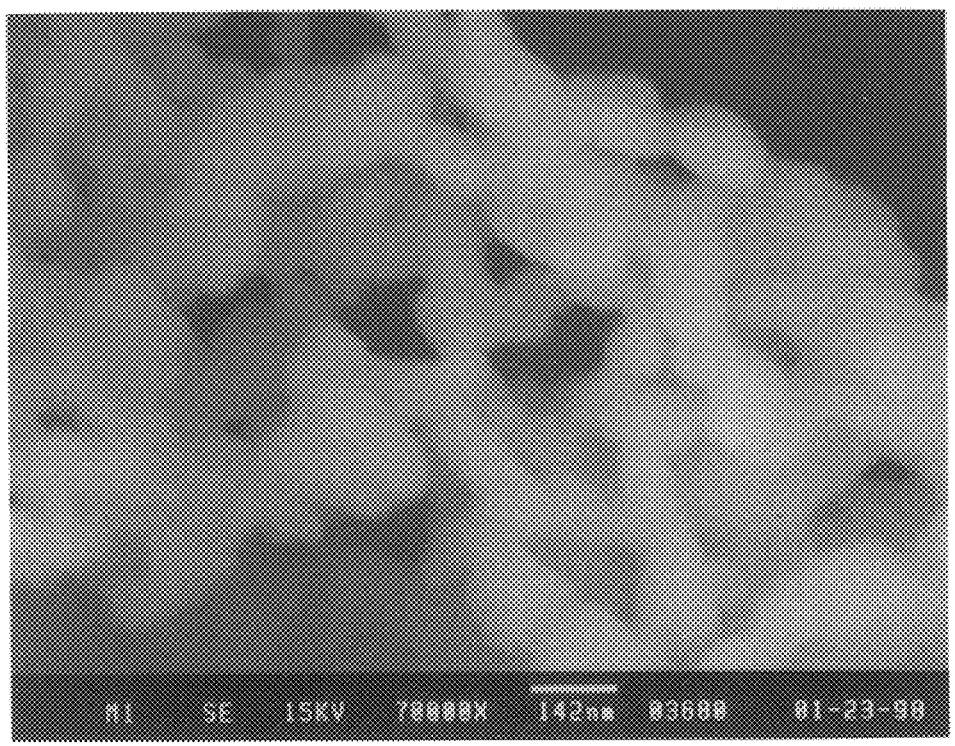

Referring to FIG. 1, a bed (3) of 200 grams of tantalum pentoxide was placed on a porous tantalum plate 4 suspended above magnesium metal chips (5) contained in a tantalum boat. The container was covered with a tantalum lid and placed in a sealed retort with argon (Ar) passed through the sealed volume via nozzle (6). The boat was heated to and maintained at 1000° C. for six hours in an argon/magnesium gas atmosphere utilizing a bed (5) of solid magnesium chips maintained in a region wholly separate from the oxide bed. After cooling to room temperature, the product mixture was passivated by introducing argon-oxygen mixtures, containing 2, 4, 8, 15 inches (Hg, partial pressure) of $O_2(g)$, respectively, into the furnace. Each mixture was in contact with powder for 30 minutes. The hold time for the last passivation with air was 60 minutes. The magnesium oxide was separated from the tantalum powder by leaching with dilute sulfuric acid and then rinsed with high purity water to remove acid residues. The product was a free flowing, black powder. Samples of the product (designated as Ta GR-2D) are shown in scanning electron micrographs (SEMs) at FIGS. 5A, 5B, 5C at 15,700, 30,900 and 60,300 magnifications, respectively, taken in an electron microscope operated at 15 kilovolts. A comparison is given at FIGS. 5D and 5E which are 70,000 magnification (×) SEMs of tantalum powder made by sodium reduction. Properties of the tantalum powder of FIGS. 5A, 5B, 5C are given in Table 2.1, below.

TABLE 2.1

| Content of Included Chemical Elements (ppm) | | | | | | | | | | Surface area |
|---|---|---|---|---|---|---|---|---|---|---|
| O | N | C | Cr | Fe | Ni | Na | K | Ca | Si | $(cm^2/gm)$ |
| 12,900 | 126 | 75 | <5 | 23 | <5 | <1 | <10 | <2 | <8 | 37,600 |

The oxygen concentration to surface area ratio was consistent with surface oxygen only, indicating that the tantalum oxide was completely reduced.

Figure 2:
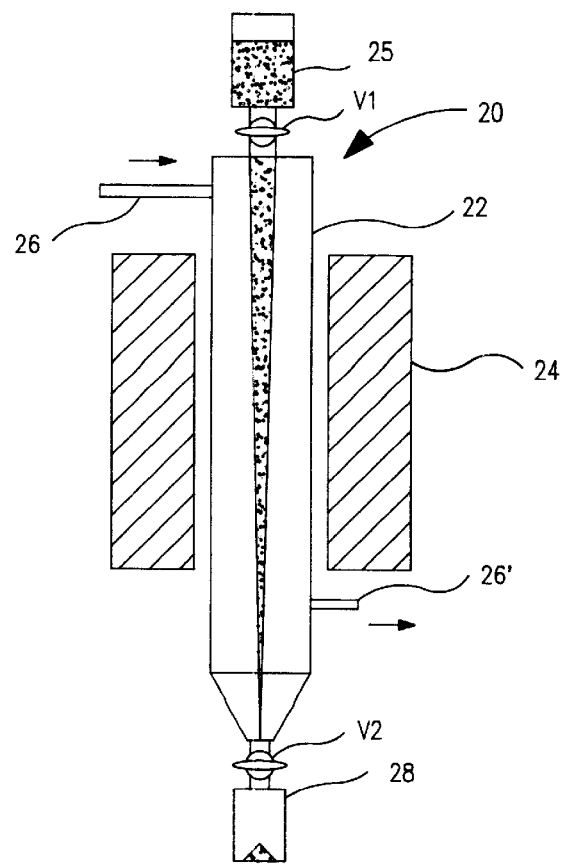
Figure 3:
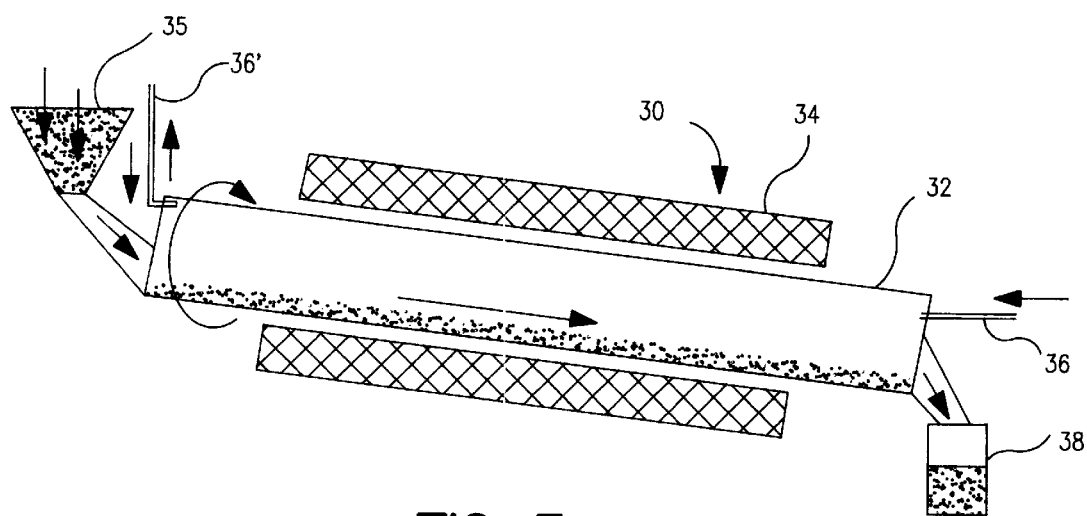
Figure 4:
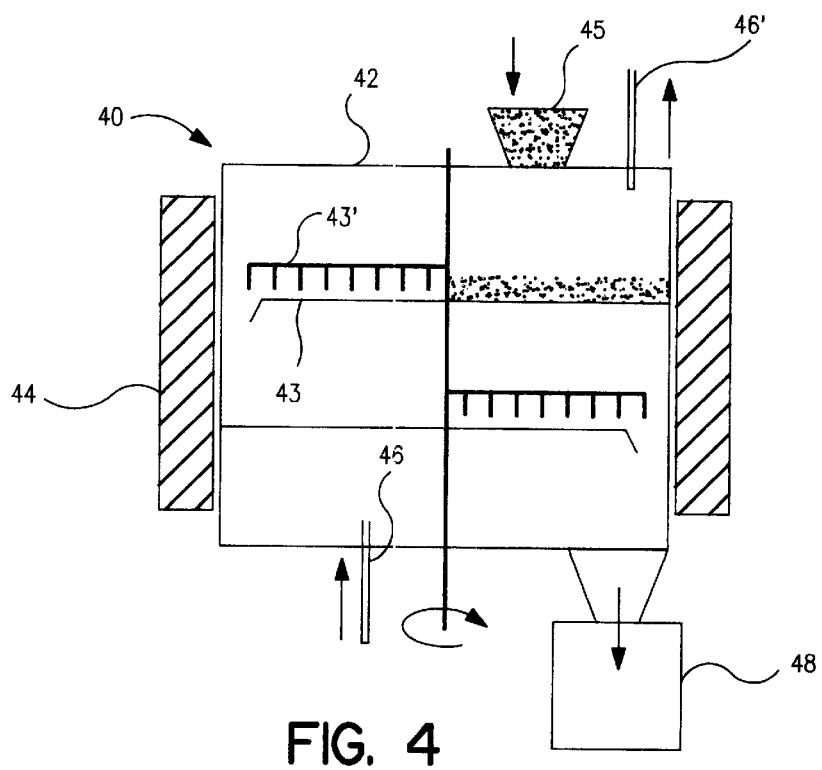

Alternate forms of reactor to the one shown in FIG. 1 (and discussed in Example 2) are shown in FIGS. 2–4. FIG. 2 shows a flash reactor 20 with a vertical tube surrounded by a heater 24, a feed source 25 of metal oxide and a source 26 of reducing agent (e.g. Mg) vapor (mixed in argon), an argon outlet 26' and a collector 28 for metal and oxide of the reducing agent. Valves V1, V2 are provided. Particles of the oxide drop through the tube and are flash reduced. FIG. 3 shows a rotary kiln 30 with an inclined rotating tube 32, heater 34, oxide hopper 35, gas source (reducing agent and diluent, e.g. argon) and outlet 36, 36', and collector 38 for metal and reducing agent oxide. FIG. 4 shows a multiple hearth furnace 40 with a retort 42 containing rotary trays 43 and splined paddles, 43, heater 44, oxide source 45, gas source and exit 46, 46' and collector 48. Still other forms of reactors such as conventional per se fluid bed furnace reactors or Contop, KIVCET types can be used.

EXAMPLE 3

Figure 6:
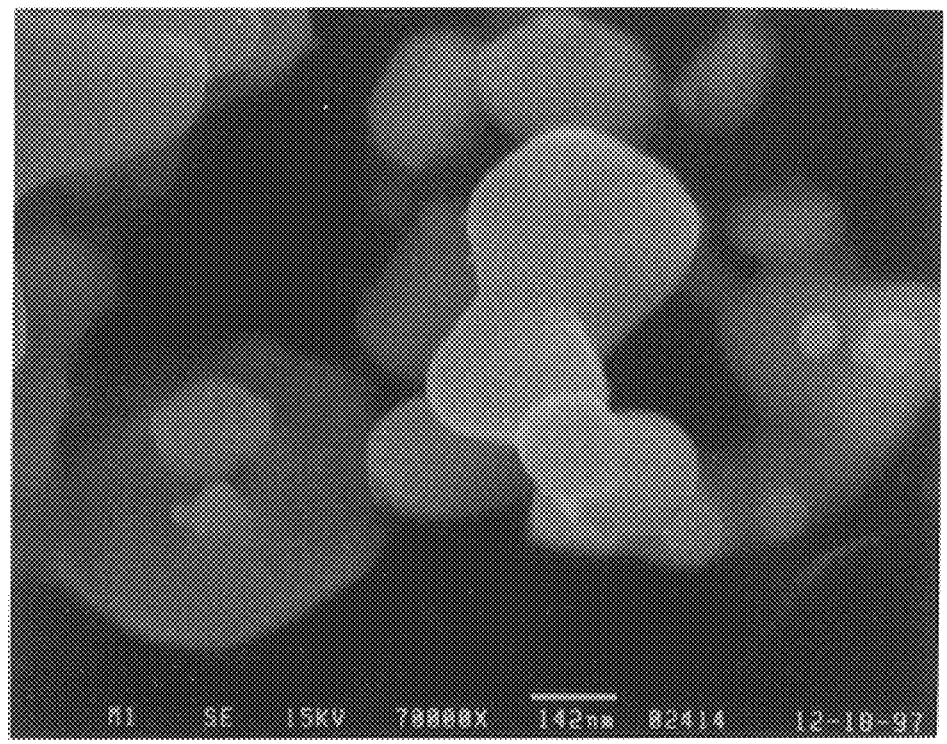
Figure 7A:
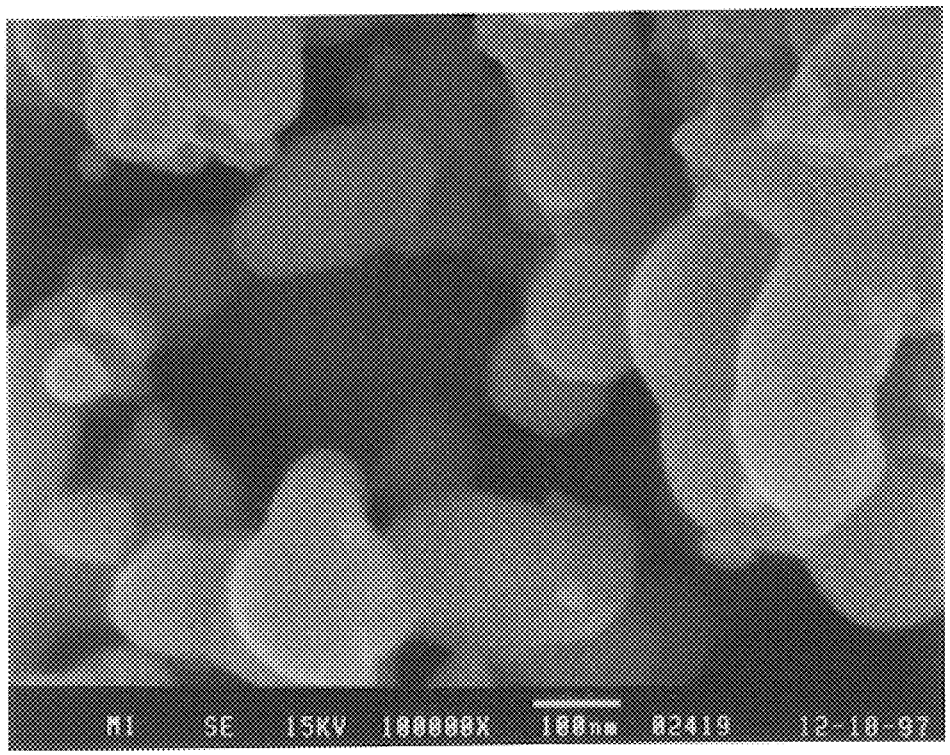
Figure 7B:
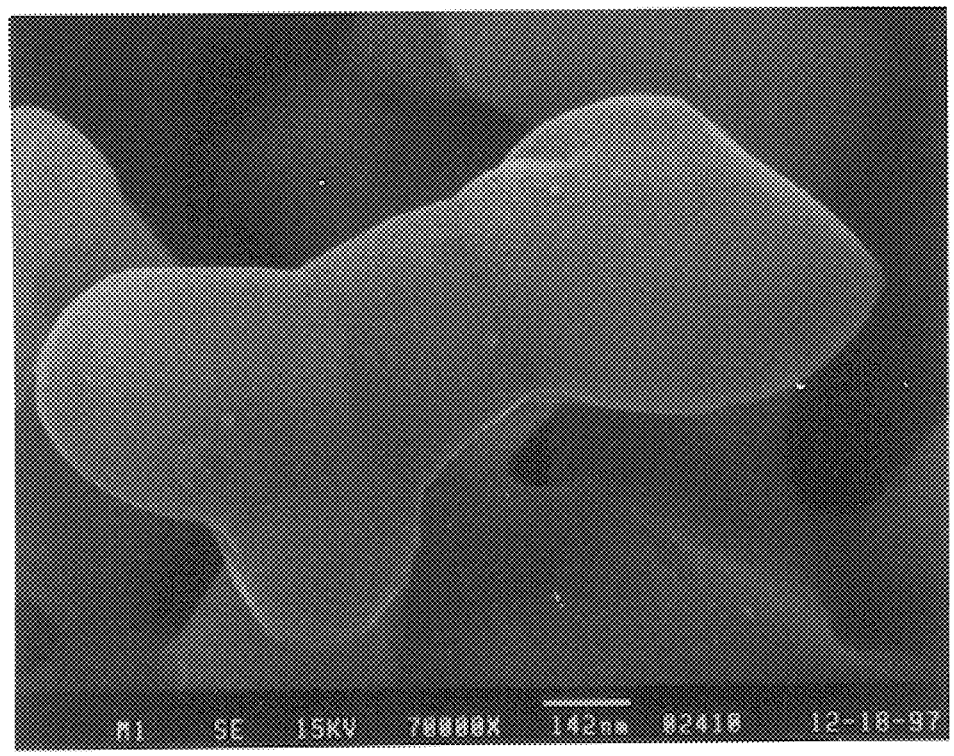

Tantalum powder with surface area of 57,000 $cm^2/gm$ made according to the procedure in Example 2 was deoxidized by blending the powder with 2 W/W % Mg and heating at 850° C. for two hours in an argon atmosphere. Separation of reducing agent source and oxide is not necessary in this follow up deoxidation step. The deoxidized powder was allowed to cool and then passivated, leached, and dried. An SEM (100,000 x) of the deoxidized (finished) powder appears at FIG. 7A and an SEM (70,000x) of finished sodium reduced powder appears at FIG. 7B. The morphology differences are apparent. After doping with 100 ppm P by adding an appropriate amount of $NH_4H_2PO_4$, the powder was pressed into pellets weighing 0.14 grams at a press density of 5.0 g/cc. An SEM of the further deoxidized powder is given at FIG. 6 The pellets were sintered in vacuum at 1200° C. for 20 minutes. The pellets were anodized to 30 volts in 0.1 volume percent (V/V %) $H_3PO_4$ solution at 80° C. The formation current density was 100 mA/gm and the hold time at the formation voltage was two hours. The average capacitance of the anodized pellets was 105,000 $\mu F(V)/gm$ and the leakage current measured after five minutes application of 21 V was 0.9 $nA/\mu F(V)$.

EXAMPLE 4

Figure 7C:
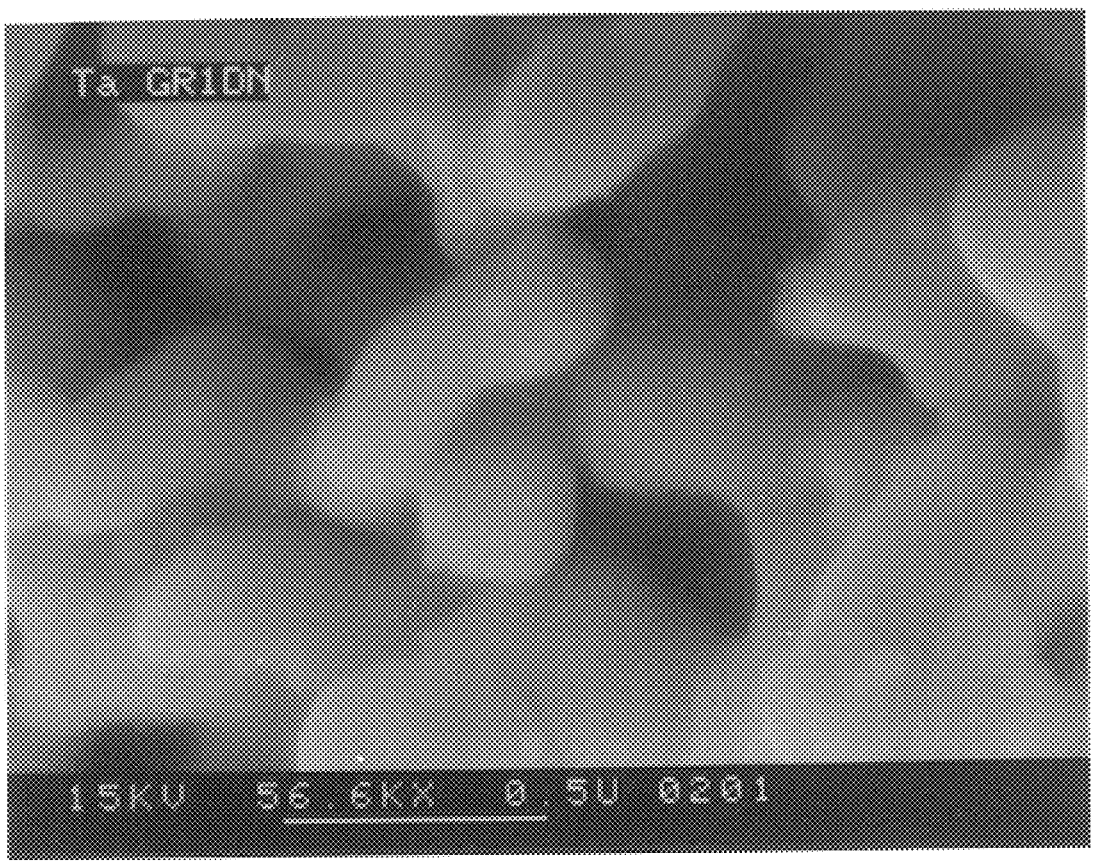

Powder with surface area of 133,000 cm²/gm and bulk density of 27.3 g/m³ made as described in Example 2 was treated as in Example 3. An SEM (56,600x) of the finished powder appears at FIG. 7C. Pellets made from the deoxidized powder were anodized to 16 V using the conditions in Example 3. The average capacitance of the anodized pellets was 160,000 $\mu F$ (V)/gm.

EXAMPLE 5

Nine hundred grams of $Ta_2O_5$ was reduced with gaseous magnesium at 900° C. for two hours. The magnesium oxide was removed from the reduction product by leaching with dilute sulfuric acid. The resulting powder had a surface area of 70,000 cm²/gm and was deoxidized at 850° C. for two hours using 8 W/W % magnesium. One (1.0) W/W % $NH_4Cl$ was added to the charge to nitride the tantalum. The deoxidized powder was treated as described in Example 3. The P doping level was 200 ppm. The powder was deoxidized again using the same time and temperature profile with 2.0 W/W % Mg and no $NH_4Cl$. Residual magnesium and magnesium oxide were removed by leaching with dilute mineral acid. The chemical properties of the powder are given in Table 5.1, below. The powder had a surface area of 9,000 cm²/gm and excellent flowability. Pressed pellets were sintered at 1,350° C. for twenty minutes and anodized to 16 V in 0.1 V/V % $H_3PO_4$ at 80° C.

The capacitance of the anodized pellets was 27,500 $\mu F(V)/gm$ and the leakage was 0.43 $nA/\mu F(V)$.

TABLE 5.1

| Chemical Element (ppm) | | | | | | | | | |
|---|---|---|---|---|---|---|---|---|---|
| O | N | C | Cr | Fe | Ni | Na | K | Ca | Si |
| 2610 | 2640 | 95 | 8 | 18 | <5 | 1 | <10 | <2 | 41 |

EXAMPLE 6

500 gms of $Ta_2O_5$ were reduced at 1,000° C. for six hours with gaseous magnesium. Properties of the primary powder so produced are given in Table 6.1, below:

TABLE 6.1

| O, ppm | N, ppm | C, ppm | Na, ppm | K, ppm | Sa, cm²/g |
|---|---|---|---|---|---|
| 19,000 | 1693 | 49 | <1 | <10 | 60,600 |

The primary powder was deoxidized at 850° C. for two hours. 4 W/W % Mg and 1 W/W % $NH_4Cl$ were added. MgO was leached with mineral acid. Then the powder was doped at 200 ppm P by adding the equivalent amount of $NH_4H_2PO_4$. The powder was deoxidized for the second time at 850° C. for two hours and then nitrided at 325° C. by adding a gaseous mixture containing 80% argon and 20% nitrogen. Some properties of the finished powder are given in Table 6.2, below.

TABLE 6.2

| O, ppm | N, ppm | C, ppm | Na, ppm | K, ppm | Sa, cm²/g |
|---|---|---|---|---|---|
| 6050 | 3430 | 64 | <1 | <10 | 24,300 |

Pellets were made from the powder at a press density of 5.0 gm/cc. The sintered pellets were anodized at 80° C. to 16 volts in 0.1 W/W % $H_3PO_4$ solution. Capacitances and leakages as a function of sintering temperature are given in Table 6.3, below.

TABLE 6.3

| Sintering Temperature (° C.) | Capacitance $\mu F$ (V)/gm | Leakage $\mu A/\mu$ F(V) |
|---|---|---|
| 1,200 | 143,000 | 0.77 |
| 1,250 | 121,000 | 0.88 |
| 1,300 | 96,000 | 1.01 |

EXAMPLE 7 (comparative)

Potasium heptafluoroniobate ($K_2NbF_7$) was reduced with sodium using a stirred reactor molten salt process similar to the ones described by Hellier et al. and Hildreth et al.[6] The diluent salt was sodium chloride and the reactor was made from Inconel alloy. The niobium metal powder was separated from the salt matrix by leaching with dilute nitric acid ($HNO_3$) and then rinsing with water. Selected physical and chemical properties are given in Table 7.1, below. The very high concentrations of the metallic elements, nickel, iron and chromium, make the powders unsuitable for use as capacitor grade material. The contamination resulted because of the inherent corrosive nature of the $K_2NbF_7$. This property makes the sodium reduction process unsuitable for making capacitor grade niobium powder.

[6] R. W. Hildreth, M. D. Shaw, T. B. Tripp and L. G. Gibbons, U.S. Pat. No. 5,442,978, 1995.

TABLE 7.1

| Sample # | SA | SBD | FAPD | O (ppm) | Ni | Cr | Fe |
|---|---|---|---|---|---|---|---|
| 1 | 13820 | 8.7 | 1.76 | 6080 | 18000 | 2970 | 2660 |
| 2 | 11700 | 9.4 | 1.48 | 4930 | 11300 | 4790 | 2060 |

SBD = Scott Bulk Density (g/in³), FAPD = Fisher Average Particle Diameter ($\mu$)

SBD=Scott Bulk Density (g/in³), FAPD=Fisher Average Particle Diameter ($\mu$)

EXAMPLE 8

Two hundred grams of niobium pentoxide was reduced as described in Example 2. The resulting product was a free flowing black powder and had a surface area of 200,800 cm²/gm. The passivated product was leached with dilute nitric acid solution to remove magnesium oxide and residual magnesium and then with high purity water to remove residual acid. This material was blended with ten (10.0)W/W % Mg and deoxidized at 850° C. for two hours. Physical and chemical properties of the powder are listed in table 8.1, below. The powder was doped with 100 ppm P as described in Example 3.

TABLE 8.1

Physical and Chemical Properties of Niobium Powder

| Chemical Element (ppm) | | | | | | | | | | Surface Area |
|---|---|---|---|---|---|---|---|---|---|---|
| O | N | C | Cr | Fe | Ni | Na | K | Ca | Si | cm²/gm |
| 13000 | 620 | 40 | 27 | 45 | 21 | 8 | 1 | 3 | 26 | 40,900 |

Figure 8A:
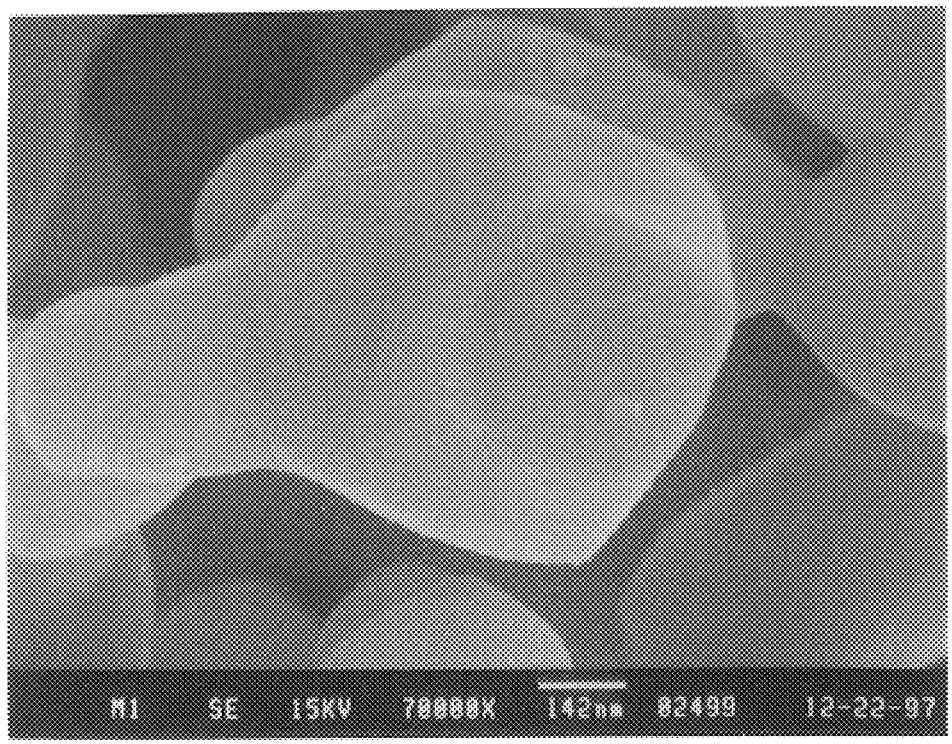
Figure 8B:
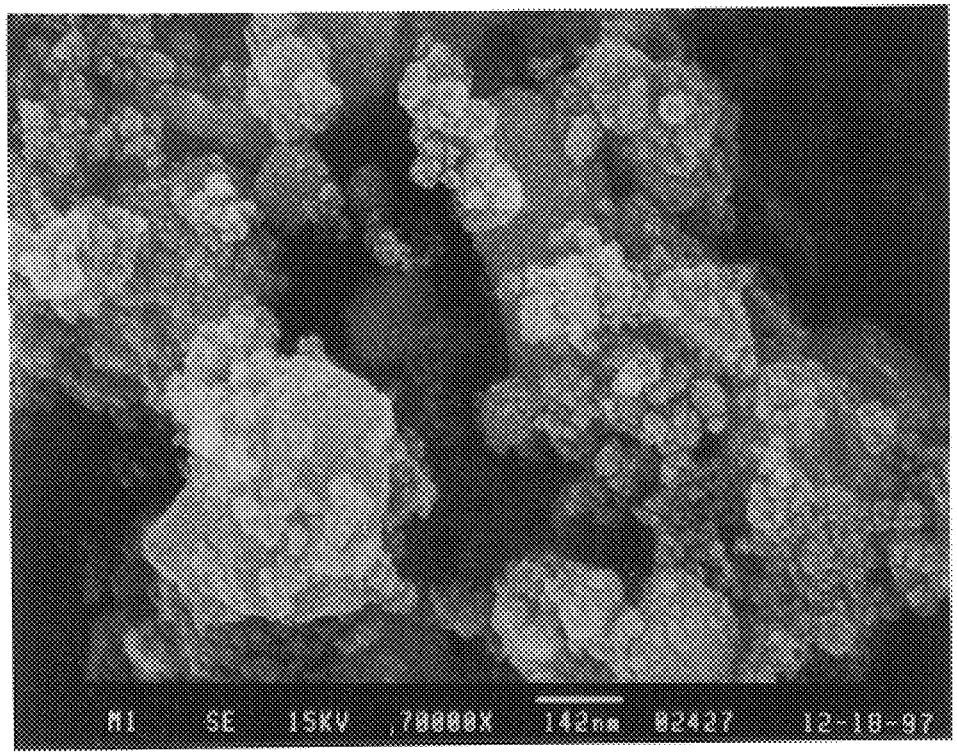
Figure 8C:
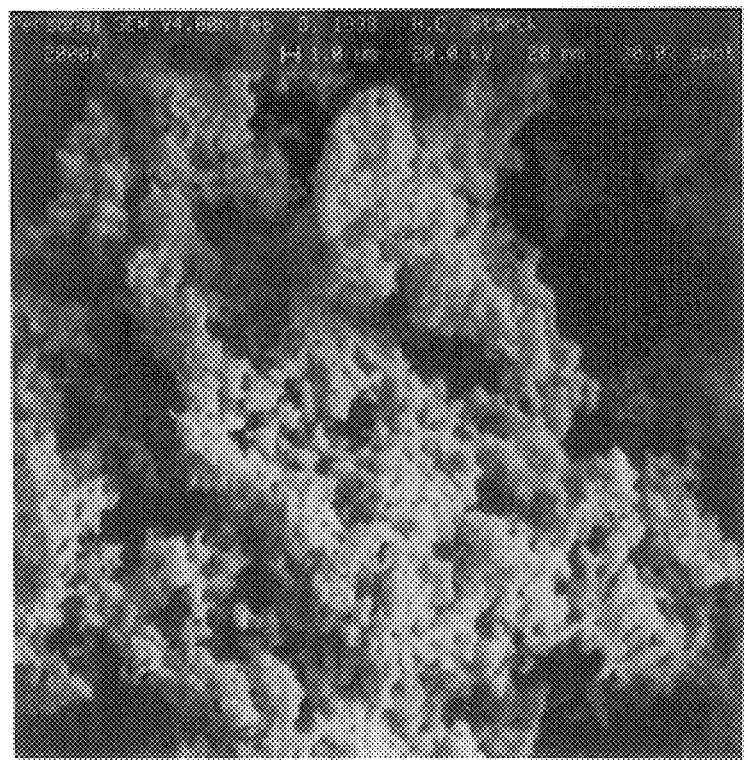
Figure 8D:
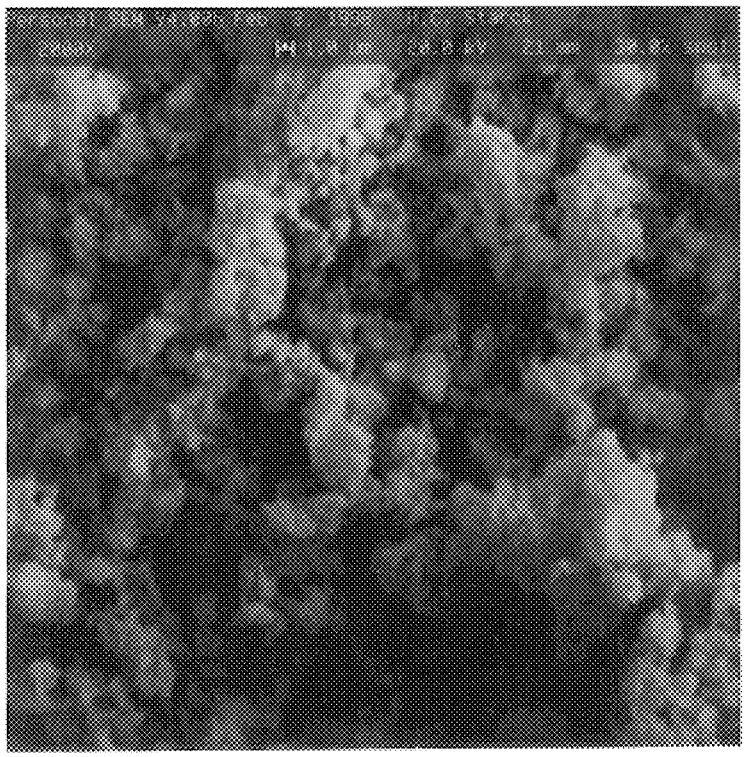

SEMs (70,000×) appear at FIGS. 8A and 8B, respectively, for niobium powders produced by liquid sodium (Ex. 7) and magnesium gas (Ex. 8) reduction. Note the clustering of small particles as barnacles on large ones is much more pronounced in FIGS. 8B than in 8A. FIGS. 8C, 8D are SEMs (2,000×) of, respectively niobium powder as produced by sodium reduction and magnesium gas reduction.

The niobium powder produced by liquid sodium reduction has large (>700 nm) joined (300 nm+) grains protruding and facets that give the product a blocky shape and fine grain material (order of 10 nm, but some up to 75 nm) as barnacles while the niobium powder produced by magnesium gas reduction has a base grain size of about 400 nm and many smaller grains of about 20 nm thereon many of which smaller grains are themselves agglomerates of up to 100 nm in size.

EXAMPLE 9

Pellets weighing 0.14 gm were prepared from the niobium powder produced in Example 8. The pellets were anodized in 0.1 V/V % $H_3PO_4$ solution at 80° C. The current density was 100 mA/gm and the hold time at the formation voltage was two hours. Electrical results as a function of pellet press density, formation voltage and sintering temperature are given in Table 9.1, below.

TABLE 9.1

Summary of Electrical Properties (capacitance, leakage) of Niobium Powder at 3.0, 3.5 (g/cc) Press Densities

| Sintering Temperature (° C.) | Capacitance (µF (V)/gm) | | Leakage (nA/µF (V)) | |
|---|---|---|---|---|
| | 3.0 | 3.5 | 3.0 | 3.5 |
| | 16 V Formation | | | |
| 1300 | 29,500 | 20,000 | 1.6 | 4.7 |
| 1350 | 21,000 | 16,000 | 0.7 | 1.5 |
| | 40 V Formation | | | |
| 1250 | 53,200 | 44,500 | 2.1 | 4.0 |
| 1300 | 31,000 | 22,300 | 1.2 | 4.7 |
| 1350 | 26,500 | 20,000 | 0.7 | 1.0 |

EXAMPLE 10

Niobium oxide was reduced with gaseous magnesium as described in Example 8. The resulting powder was deoxidized twice. During the first deoxidation, 2.0 W/W % $NH_4Cl$ was added to the charge to nitride the powder. The deoxidation conditions were 850° C. for two hours with 7.0 W/W % Mg. After leaching and drying, the powder was doped with 200 ppm P. The second deoxidation was carried out at 850° C. for two hours using 2.5 W/W % Mg. The finished powder had a surface area of 22,000 cm²/gm and good flowability. The chemical properties are given in Table 10.1, below. Pellets were prepared from the powder at a press density of 3.5 g/cm³. The sintered pellets were anodized to 16 volts in 0.1 V/V % $H_3PO_4$ solution at 80° C. using a current density of 100 mA/g and a two hour hold. The electrical properties are given in Table 10.2, below.

TABLE 10.1

| Chemical Element (ppm) | | | | | | | | |
|---|---|---|---|---|---|---|---|---|
| O | N | C | S | Cr | Fe | Ni | Si | Ta |
| 7490 | 8600 | 166 | 9 | <20 | 114 | <20 | 34 | <200 |

TABLE 10.2

| Electrical Properties | | |
|---|---|---|
| Sintering Temperature (° C.) | Capacitance (µF(V)/gm) | Leakage (nA/µF(V)) |
| 1250 | 68,000 | 0.24 |
| 1300 | 34,500 | 0.14 |
| 1350 | 11,300 | 0.32 |

EXAMPLE 11

Several samples, each approximately 25 grams, of $WO_3$, $ZrO_2$, and $V_2O_3$ were reduced individually with gaseous magnesium at 950° C. for 6 hours. The reduction products were leached with dilute sulfuric acid to remove residual magnesium oxide. The product was a black metal powder in each case. The tungsten and zirconium powders had oxygen contents of 5.9 and 9.6 W/W % respectively, indicating that the metal oxides were reduced to the metallic state.

The present process appears to represent the only demonstrated way of making high quality chemically reduced niobium powder. The reduction of the metal oxide with gaseous reacting agents, such as magnesium, as shown herein is thus particularly suitable for producing powders useable as metal-metal oxide capacitor substrates.

Although the reduction process was carried out with the metal oxide in a bed in contact with a source of magnesium gas, the reduction can take place in a fluidized bed, rotary kiln, flash reactor, multiple hearth or similar systems provided the magnesium or other reducing agent is in the gaseous state. The process will also work with other metal oxides or metal oxide mixtures for which the reduction reaction with gaseous magnesium or other reducing agent has a negative Gibbs free energy change.

There are several advantages to the gaseous reduction processes described herein. Treatment of the reduction products is much less complicated and expensive than post reduction workup of tantalum powder produced by liquid phase reactions such as the sodium reduction of $K_2TaF_7$ in a molten salt system. No fluoride or chloride residues are produced in the present process. This eliminates a potentially serious disposal problem or the need to institute an expensive waste recovery system. The reduction of metal oxides with gaseous reducing agents gives powders with much higher surface areas than powders produced by the molten salt/sodium reduction process. The new process easily makes powders with very high surface area compared to the traditional method; the potential for making very high performance capacitor grade powders is great with magnesium or other gaseous reducing agent.

Figure 9:
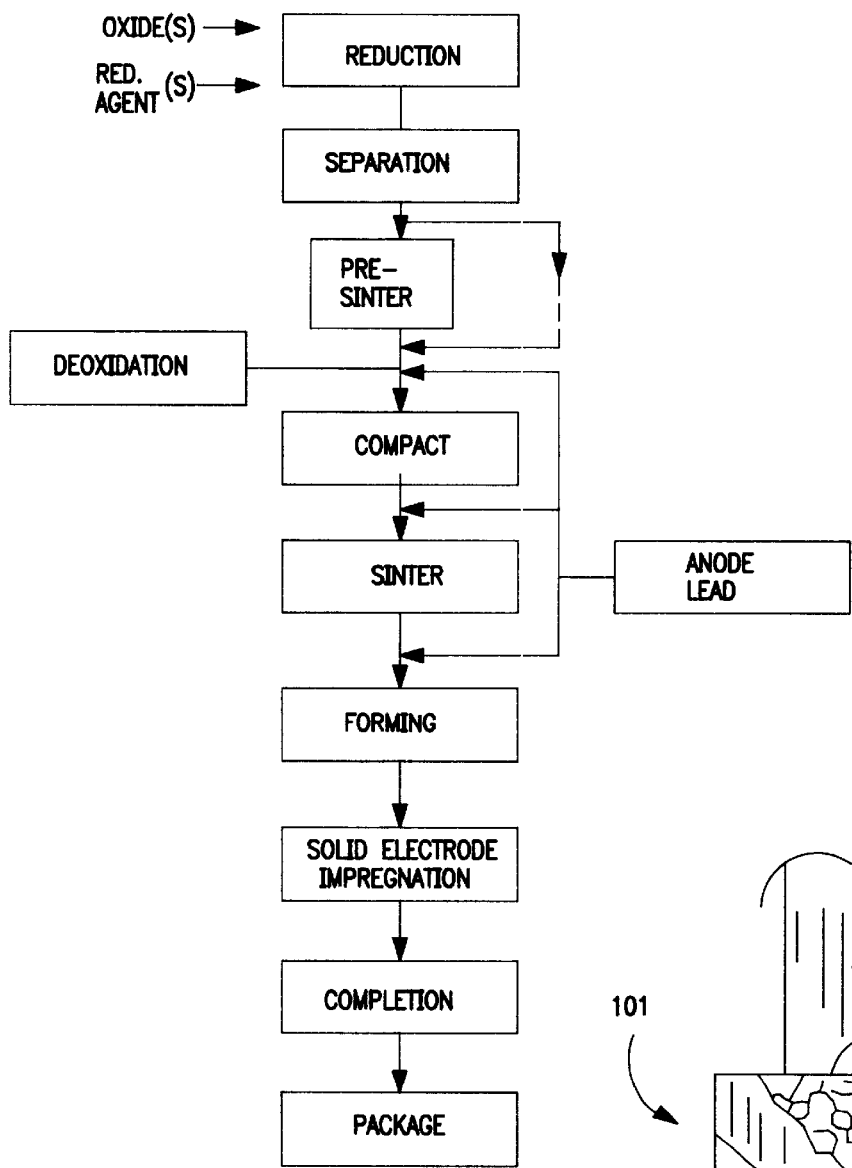
FIG. 9 is a flow chart illustrating capacitor usages of the powder and derivatives.
Figure 10:
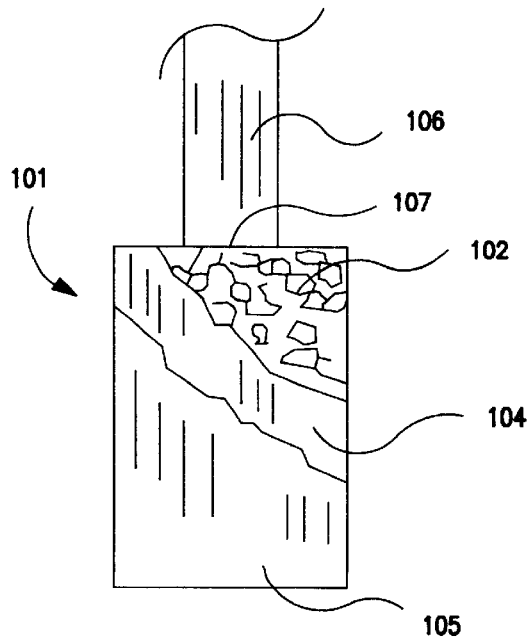
FIG. 10 is a schematic representation of an end item according to usage as a capacitor (one of several forms of capacitor usage).

FIG. 9 is a block diagram of the steps for achieving an electrolytic capacitor usage of the invention. The steps comprise reduction of metal oxide with gaseous reducing agent; separation of reduction agent oxide from a mass of resultant metal; breakdown to powder form and/or primary powder particle size; classification; optionally, pre-sinter to establish agglomerated secondary particles (controlled mechanical methods and control of original reduction or separation steps also being affective to establish agglomerates); deoxidation to reduce the oxygen concentration; compaction of primary or secondary particles to a porous coherent mass by cold isostatic pressing with or without use of compacting binders or lubricants; sintering to a porous anode form (which can be an elongated cylindrical, or slab or of a short length form such as a chip); anode lead attachment by embedding in the anode before sintering or welding to the sintered anode compact; forming the exposed metal surfaces within the porous anode by electrolytic oxidation to establish a dielectric oxide layer; solid electrode impregnation by impregnating precursors into the porous mass and pyrolysis in one or more stages or other methods of impregnation; cathode completion; and packaging. Various additional steps of cleaning and testing are not shown. The end product is illustrated (in a cylindrical form) in FIG. 10 as a Ta or Nb capacitor 101 in partial cut-away form as a porous Ta or Nb anode 102, impregnated with a solid electrolyte, surrounded by a counter-electrode (cathode) 104 and packaging sheath 105 with a dense lead wire 106 of Ta or Nb (generally matching the powder composition) that is joined to the anode by a weld joint 107. As stated above, other known per se capacitor forms (different shape factors, different metals, different electrolyte systems, different anode lead joinder, etc.) are accessible through the present invention.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Process for production of capacitor or metallurgical or chemical grade metal powder selected from the class consisting of tantalum and niobium, comprising the steps of:

(a) providing an oxide or mixed oxides of the metal(s), the oxide or mixed oxides being in a form, that is traversable by gas, (b) generating a mixture of gaseous reducing agent and inert diluent gas and passing the gas mixture through the mass at an elevated temperature, effective to gradually reduce the oxide(s), (c) selecting the reactants, porosity of the oxide, temperature and time of the reduction reaction for substantially complete reduction of the oxide(s) to free the metal portion(s) thereof, the residual oxide of reducing agent formed in the reaction being easily removable, whereby a high surface area, flowable primary metal powder of tantalum and/or niobium is formed in a process that essentially avoids use of molten state reducing agent in production of primary powder.

2. Process in accordance with claim 1 wherein the metal consists essentially of tantalum and the oxide is tantalum pentoxide.

3. Process in accordance with claim 1 wherein the metal is niobium and the oxide consists essentially of niobium pentoxide or a niobium suboxide.

4. Process in accordance with any of claims 1, 2 or 3 wherein the reducing agent is selected from the class consisting of Mg, Ca,Al, Li, Ba and Sr.

5. Process in accordance with claim 1 wherein the primary metal powder is subjected to a further deoxidation treatment to produce a finished powder.

6. Process in accordance with claim 5 wherein one or more finishing deoxidation steps are provided as an extension of the reduction reaction.

7. Process in accordance with claim 5 wherein the finishing deoxidation is a separate treatment.

8. Process in accordance with any of claims 1, 5, 6 or 7 wherein the primary or finished powder is processed to an agglomerated secondary form.

9. Process in accordance with claim 8 wherein a deoxidation step is applied to the agglomerated secondary form of the powder.

10. Process in accordance with any of claims 1–3 and 5–7 wherein the metal powder is further formed into a coherent porous mass.

11. Process in accordance with claim 9 wherein the metal powder is further formed into a coherent porous mass.

* * * * *